United States Patent [19]

Ramesohl et al.

[11] Patent Number: 4,457,705

[45] Date of Patent: Jul. 3, 1984

[54] CALCINING SYSTEM FOR THE MANUFACTURE OF CEMENT CLINKER AND THE LIKE

[75] Inventors: Hubert Ramesohl, Bergisch-Gladbach; Horst Herchenbach, Hennef, both of Fed. Rep. of Germany

[73] Assignee: Klöckner-Humboldt-Deutz AG, Fed. Rep. of Germany

[21] Appl. No.: 413,258

[22] Filed: Aug. 31, 1982

[30] Foreign Application Priority Data

Sep. 2, 1981 [DE] Fed. Rep. of Germany ....... 3134798

[51] Int. Cl.$^3$ ........................... F27B 7/02; F27D 7/00; F27D 15/02
[52] U.S. Cl. ........................................ 432/106; 432/4; 432/78; 432/80
[58] Field of Search ......................... 432/4, 78, 80, 106

[56] References Cited

U.S. PATENT DOCUMENTS

| | | | |
|---|---|---|---|
| 3,091,443 | 5/1963 | Herz et al. | 432/78 |
| 3,782,888 | 1/1974 | Cnare | 432/14 |
| 3,824,069 | 7/1974 | Brachthauser et al. | 432/80 |
| 4,104,018 | 8/1978 | McKay | 431/208 |
| 4,193,755 | 3/1980 | Guarnaschelli et al. | 431/201 |
| 4,315,734 | 2/1982 | Ramesohl et al. | 432/106 |
| 4,367,065 | 1/1983 | Cnare | 432/106 |

FOREIGN PATENT DOCUMENTS

Ad.29408 of 1906 United Kingdom ................. 432/80

Primary Examiner—John J. Camby
Attorney, Agent, or Firm—Hill, Van Santen, Steadman & Simpson

[57] ABSTRACT

A calcining system for the manufacture of cement clinker and the like including the combination of a preheater into which the raw material to be calcined is introduced, a rotary kiln which receives the preheated material either directly or through a preliminary calcinator, and a cooler which receives the discharge of the rotary kiln. In accordance with the invention, a heater means is operatively associated directly with the cooler to bring the cooler up to operating temperatures during start-up.

10 Claims, 6 Drawing Figures

CALCINING SYSTEM FOR THE MANUFACTURE OF CEMENT CLINKER AND THE LIKE

BACKGROUND OF THE INVENTION

1. Field of the Invention

The present invention is in the field of calcining systems for the manufacture of cement and the like and involves an independent heater means which cooperates with the conventional cooler in such systems to bring the cooler up to operating temperatures more quickly and more efficiently than occurs with conventional systems.

2. Description of the Prior Art

In the case of conventional calcining systems, it takes a significant time to reach temperature levels in the different zones of the calcining system which are appropriate to provide minimum temperature equilibrium. For example, to attain a suitable calcining temperature in a rotary kiln for the production of cement clinker, a temperature of recirculated air from the cooler must be in the range of about 650° to 900° C. before production can begin. Likewise, a calcinator requires an ignition temperature within the combustion chamber of at least 700° C. Customarily, a cooler is used to provide recirculating gases, the gases being heated by the product being cooled. Since the cooler, whether of the grate, tube, satellite, or shaft type possesses relatively large quantities of material with correspondingly large heat capacities, this means that in the case of a cold cooler, with no hot product being passed therethrough, there is a considerable difficulty from the standpoint of losing time between the ignition of the burners for starting up the furnace and the initiation of production. It is not uncommon, for example, to require a time interval of 24 hours or more before production can start.

The difficulties in the case of a calcining system using a tube cooler are particularly severe. In the latter case, when the tube cooler is in the cold state, over a relatively long time interval the greatest portion of the introduced heat is consumed for the purpose of heating the mass of the cooler. Such coolers are characterized by relatively high radiation and convection losses before the cooler can transmit sufficient heat to the air being drawn into the system. Consequently, in a tube cooler utilizing cooling air having a relatively low speed which sweeps over a large surface of hot product there can be no recuperative air heating until all of the components such as the wall casing, the brick lining, and the internal fittings have attained an equilibrium temperature suitable for production.

The same problem is presented in the case of a satellite cooler which basically represents a special design of a tube cooler with a plurality of parallel cooling tubes.

If secondary and tertiary air flow through a cold tube cooler along its full length during the heating up period, the secondary or tertiary air is not available for calcination purposes for a long time.

It has already been proposed, in a somewhat different context, namely, for the purpose of economically integrating a cold-milling drying system with a calcining system, that during starting up of the calcining system, it is advisable to heat the air introduced from the milling system into the tertiary air conduit together with fuel. In this way, at least a portion of the hot furnace gases are circulated back into the milling system and the remaining portion of the furnace gases is used for the purpose of heating the tertiary air conduit. Thus, simultaneously with warming up the milling system, the tertiary air conduit is also heated up together with the air introduced from the milling system, and sufficient coal dust is blown into the tertiary air conduit as necessary for heating up the air to a level approximating the operating temperature of about 800° C. Such a disclosure appears in German OS No. 29 31 214.

SUMMARY OF THE INVENTION

The present invention provides a means for starting up a complex calcining system more efficiently so as to efficiently heat the recirculating combustion air from the cooler and, in particular, to overcome the substantial problems in the case of a tube cooler or a satellite cooler.

The object of the present invention is to provide an improvement in known calcining systems for the speeding up of the starting period in the case of a system fired by means of coal dust or oil and, in particular, to eliminate problems presently existing in the case of starting up tube coolers, satellite coolers, and other coolers such as grate coolers.

The present invention provides a separate and distinct heating means for starting up the calcining system and decreasing the time involved in start-up. A heating means is operatively associated with the cooler independently of the rest of the calcining system and provides during the start-up period warm secondary air and/or tertiary air which is available for the purpose of heating up portions of the system such as the clinker calcining zone and the calcinator. This preheating leads to the attainment of operating temperatures suitable for production quicker than systems of the prior art. Through the present invention, it is possible to shorten the heat-up time significantly in the start-up period and thus avoid losses of production capacity as well as heat energy due to long start-up times.

In one embodiment of the present invention, the cooler is connected to a hot gas source. A suitable external hot gas source can, for example, be the waste heat produced from a nuclear power plant, or from another fuel burner, or it may also be a hot gas generator provided with its own burner.

It is also possible to use hot gases produced by an electric heating element or by a heat transfer system employing a circulating fluid heat transfer medium.

The separate heating means can be located in the region between the rotary kiln discharge and the clinker transport system, particularly in the case of a satellite or a tube cooler.

In another form of the present invention, there is provided a tertiary air conduit between the cooler and the preheater, and a start-up burner is positioned in this tertiary air conduit. An additional start-up burner can be included in the region of the calcinator, when one is used, such starter burner rendering possible a rapid heating of the combustion chamber of the calcining stage simultaneous with the remaining zones of the calcining system.

It should be pointed out that the present invention has as its objective, control and/or reduction of cost and time involved in the start-up state and does not relate to means which are necessary or conventional for normal production operation. In addition, there can be several start-up heaters provided at various locations in a cement clinker calcining operation in accordance with the present invention.

In the case of a calcining system which is equipped with a tube cooler which is operated by means of coal dust firing, the installation for heating the cooler is preferably arranged at its discharge end. In addition, where the entire calcining system is fueled by means of coal dust, the heater elements of the present invention will also make use of this type of fuel.

BRIEF DESCRIPTION OF THE DRAWINGS

The drawings illustrate several sample embodiments of the improvements of the present invention and are described as follows.

DESCRIPTION OF THE PREFERRED EMBODIMENTS

Figure 1:
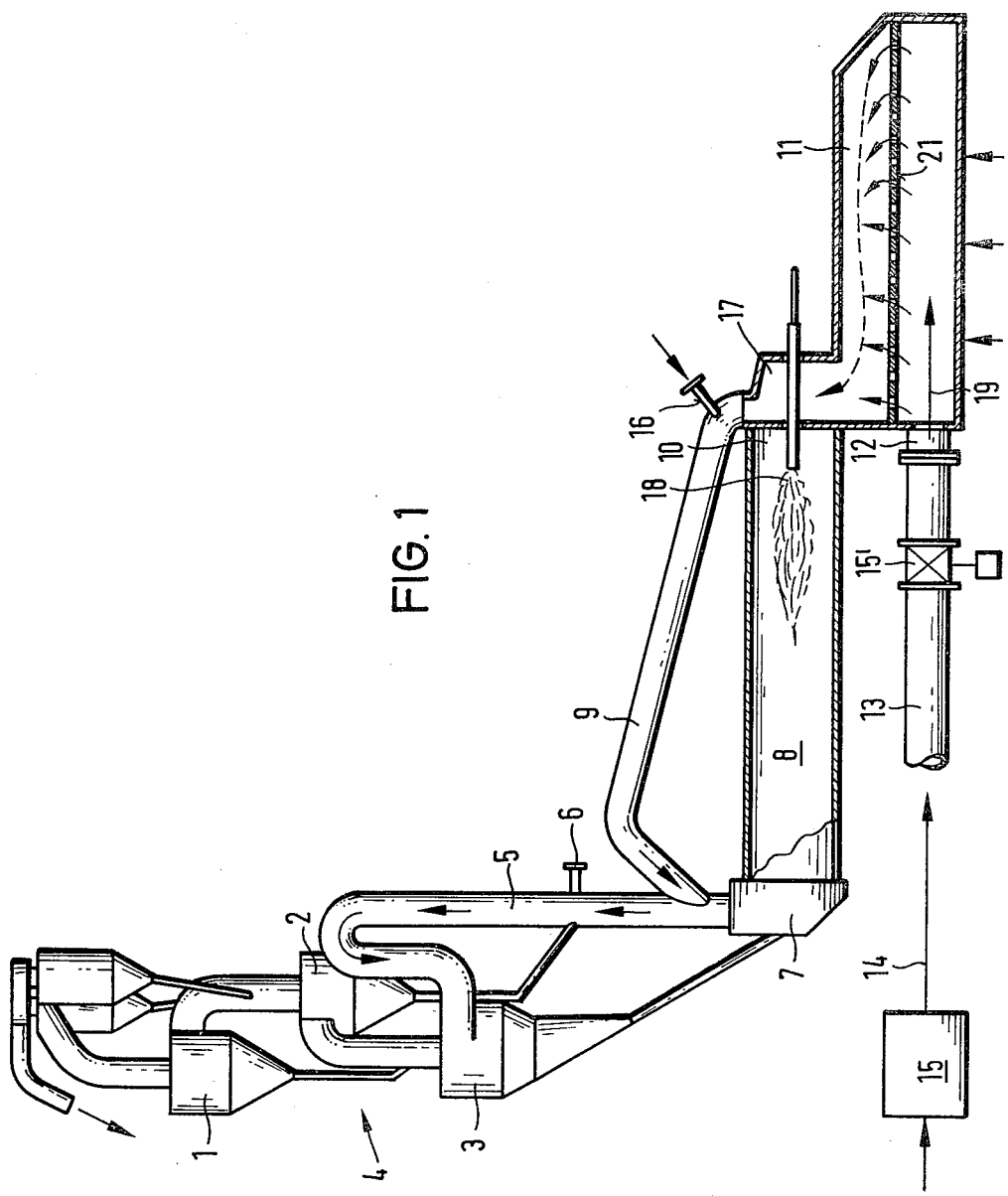
FIG. 1 is a schematic illustration of a calcining installation employing a grate cooler having a separate burner connected to a hot gas source.

In FIG. 1, reference numeral 4 indicates generally a three-stage suspension gas heat exchanger serving as the preheater, and equipped with heat exchange cyclones 1, 2, and 3. The calcinator in the form of a reaction tube 5 is equipped with a second firing burner 6 and receives hot gases from the discharge end 7 of a rotary kiln as well as through a tertiary air conduit 9. The product in passing through the rotary kiln 8 is discharged through the burner end 10 which is followed by means of a grate cooler 11. In accordance with the present invention, the cooler 11 is equipped with an installation for heating it in the start-up stage and, in the illustrated example, this takes the form of a connecting piece 12 and a conduit 13 by means of which the cooler 11 is connected to a flow of hot gas indicated by the arrow 14 from an external hot gas source 15. Such external hot gas source may, for example, consist of waste heat from a nuclear power plant, a thermal power plant, or other calcining or burning system such as a parallel line of calcining or burning units from the same cement production plant. It can also relate to a separate hot gas generator with its own burner system. A shut-off device 15' is arranged in the conduit 13 by means of which the supply of hot gas can be selectively released or shut off and also throttled. To provide a problem-free rapid heating, a start-up burner 16 is provided on the part of the tertiary air conduit 9 extending from the cooler connection housing 17 so that the tertiary air conduit 9 as well as the reaction chamber of the calcinator 5 as well as the preheater heat exchange cyclones 1, 2, and 3 can be more rapidly warmed up.

The improvement in start-up procedure which is achieved by means of the present invention will be apparent from the illustration at FIG. 1 in connection with the following description. In a cold system at the commencement of start-up, the primary burner 18 and the start-up burner 16 are ignited either simultaneously or approximately so. These two burners are initially operated with a relatively low throughput. Simultaneously, the throttle member 15' is opened and hot gas from the hot gas source 15 flows as indicated by the arrow 19 into the cooler 11. This hot gas penetrates the grate rods 21 which thus become warmed up and then flows in the form of secondary air through the cooler connection housing 17 into the rotary kiln 8. The initially cold calcining system becomes relatively rapidly warmed up through these three heat sources for a time sufficient to achieve temperatures necessary for continuous production. Then the raw meal is charged into the preheater 4, and the primary burner 18 is turned on more completely. The start-up burner 16 can then be turned down and possibly shut off. Simultaneously, also, the supply of hot gases from the hot gas source 15 is reduced by means of the throttle member 15' and finally is entirely shut off at least at the time at which hot clinker from the rotary kiln 8 enters the cooler 11. The start-up operation is thus terminated.

Figure 2A:
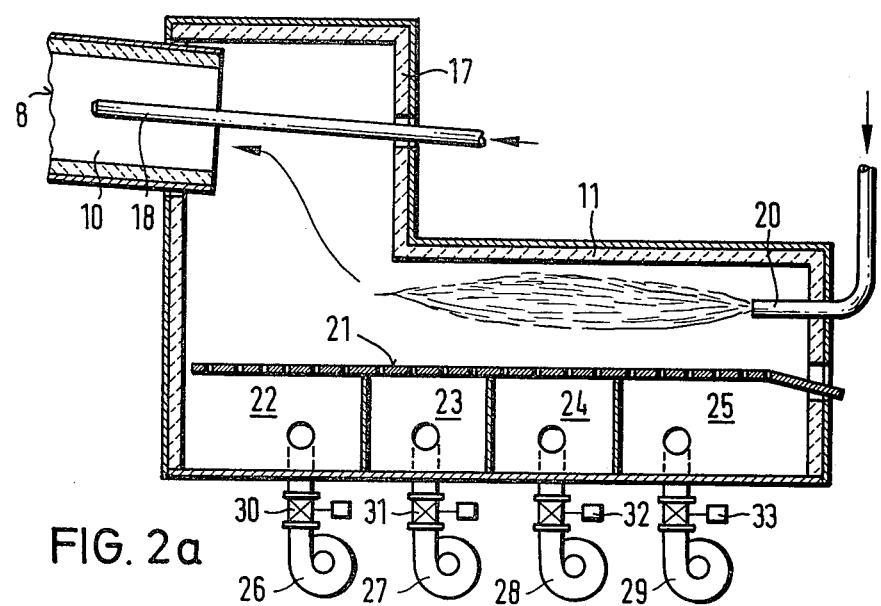
FIG. 2a is a fragmentary cross-sectional view of a grate cooler with a start-up burner.

In FIG. 2a, the grate cooler section is illustrated in partial cross section. The same functional elements are designated with the same reference numerals as in FIG. 1. In this embodiment, the heater for the start-up operation consists of a start-up burner 20 which is arranged in the gas space above the grates 21. The grate cooler 11 is subdivided into several cooling zones 22 to 25, inclusive, which are equipped with separate blowers 26 through 29, inclusive. In the supply lines to the air entry openings of the individual cooling zones 22 through 25, motor-activated shut-off devices 30 to 33 are provided which, during the start-up period after the start-up burner 20 has been ignited, can be entirely or partially closed individually or collectively. The method of operation of this form of the invention is the same as that described in connection with FIG. 1.

Figure 2B:
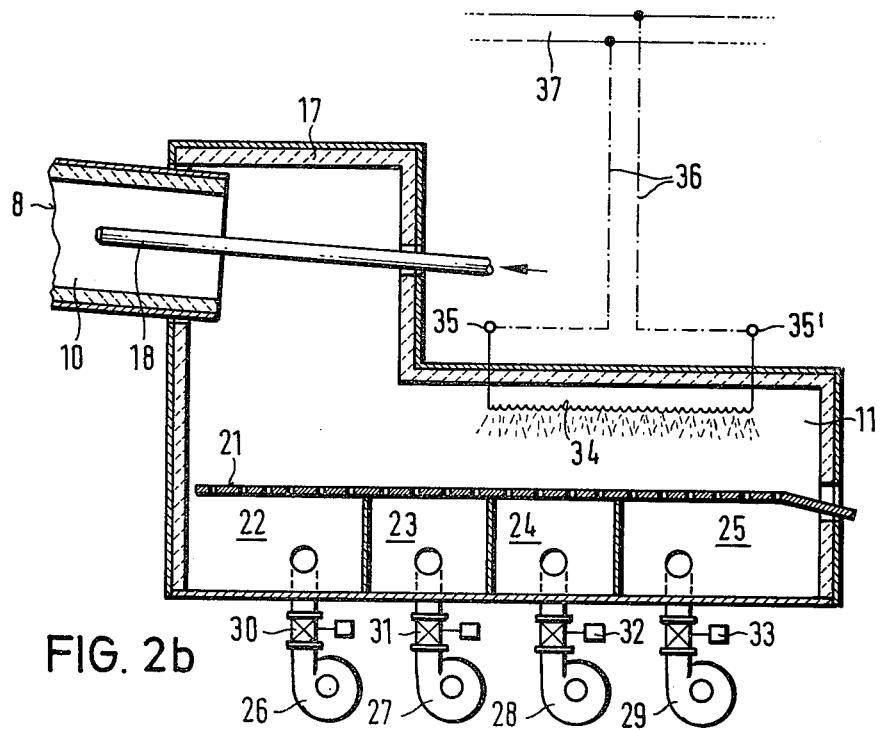
FIG. 2b illustrates a grate cooler similar to that of FIG. 2a, but provided with an electrical convection heating device.

In FIG. 2b, the same cooler is employed but instead uses an electrically heatable convection heating installation 34. The latter is connected to contacts 35, 35' and through electrical leads 36 to an electrical power supply 37. This system operates exactly as in the case of the start-up procedure according to FIG. 1.

Figure 2C:
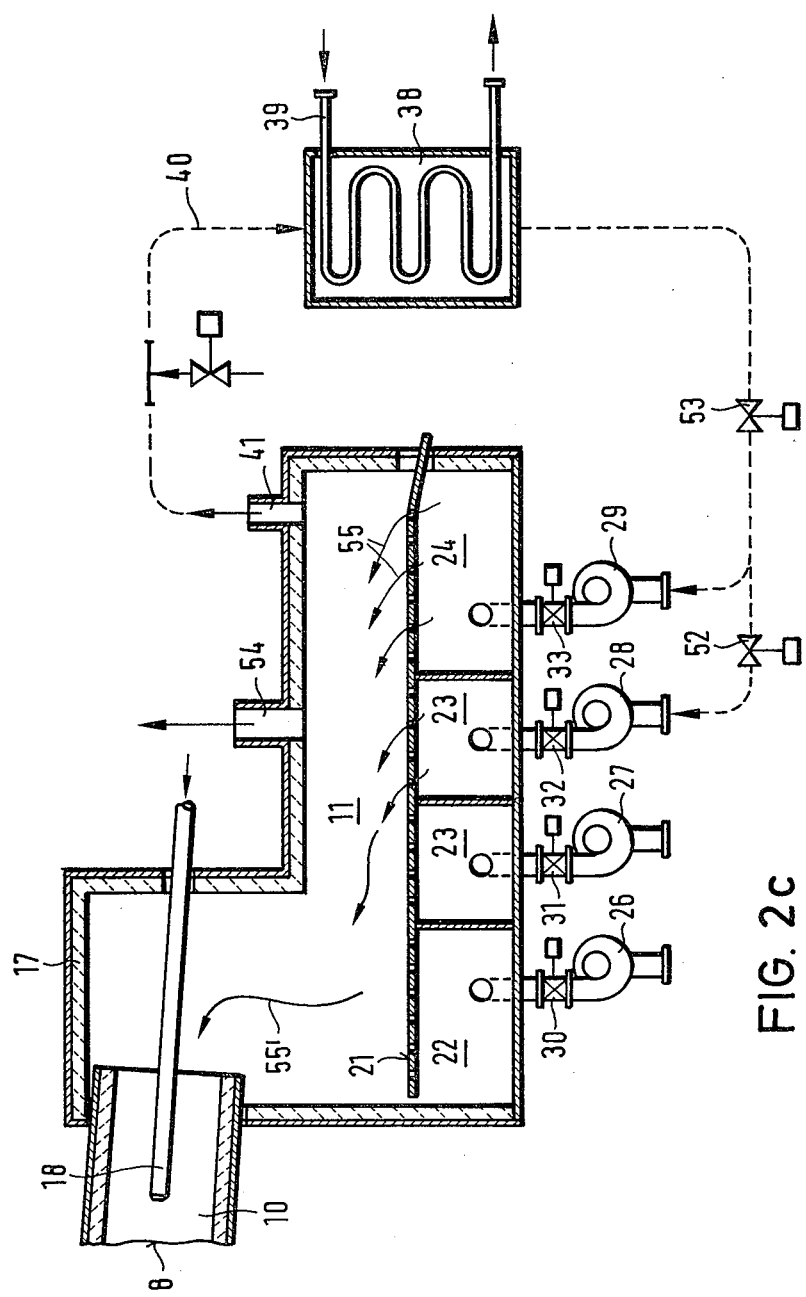
FIG. 2c also illustrates a similar grate cooler which is provided with ventilators connected to a hot gas generator.

In FIG. 2c there is shown the same grate cooler 11 but the heating installation consists of a hot gas generator 38 which takes the form of a heat exchanger through which a fluid heat exchange medium is circulated through a heat exchange pipe 39. The hot gas generator 38 is provided in the gas return line 40 which connects a gas exhaust valve or outlet 41 at the end of the cooler 11 with a low temperature level such, for example, at a temperature of 180° to 200° C., to the blowers 28 and 29. Since these two last blowers are customarily designed for hot gas operation, they could tolerate temperatures of heated gas up to approximately 400° C. Such blowers, for example, may be equipped with impeller blades consisting of heat resistant steel. Throttle members 52 and 53 permit control of the internal air situation in the cooler 11. A further regulation or control of the internal air condition exists through the arrangement of an exhaust gas connecting piece 54. The blowers 26 and 27 of the first two cooling zones 22 and 23 are likewise provided with throttle members 30 and 31. These are shut off in the start-up operation so that only the heated gas drawn up from the hot gas generator 38 reaches the cooler 11. This gas enters as shown by means of arrows 55 and 55' the space above the grate 21 to heat the cooler connection housing part 17 as well as passing into the rotary kiln 8. Consequently, the rotary kiln, grate, and cooler housings are sequentially heated in the start-up procedure.

Figure 3:
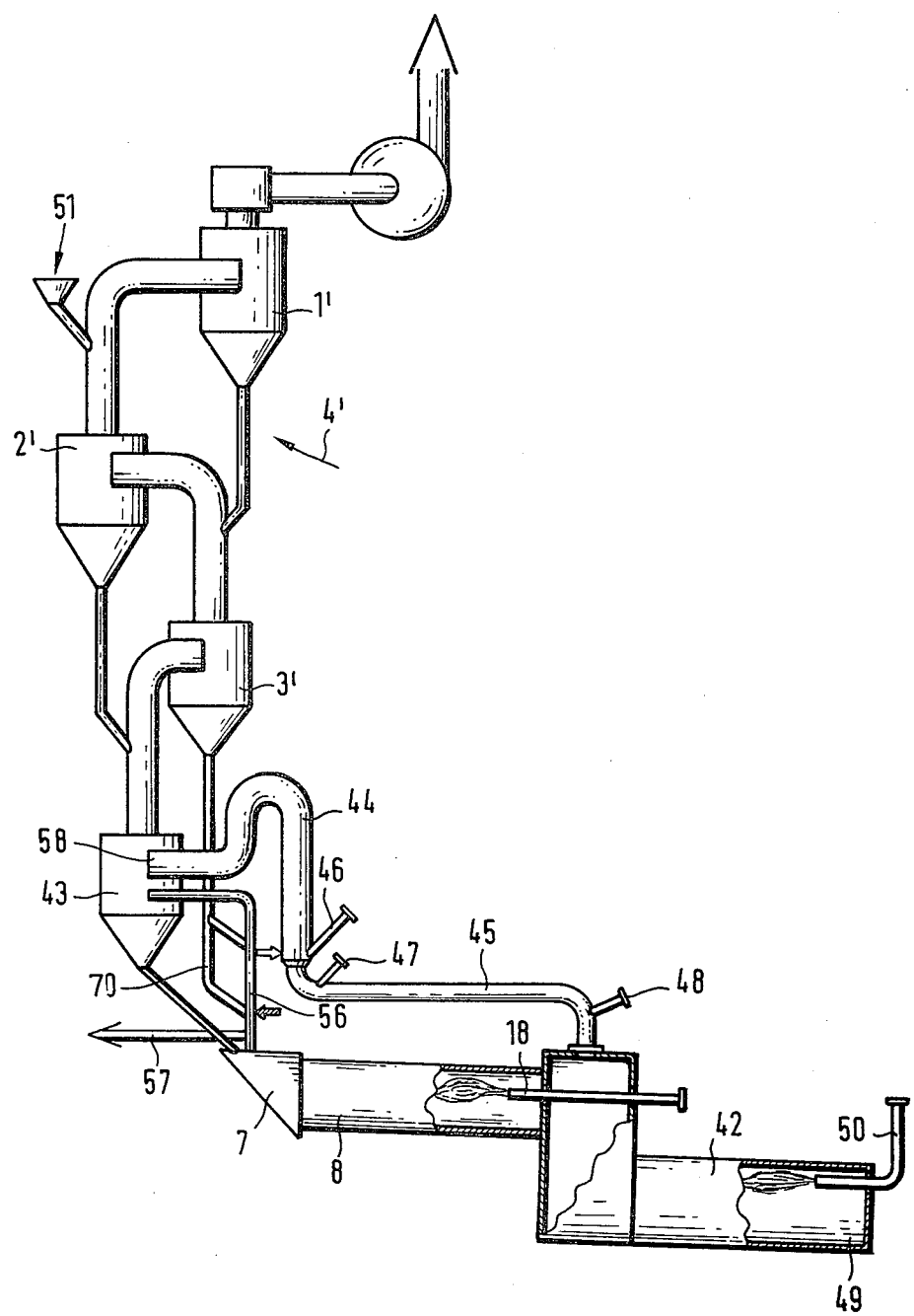
FIG. 3 is a somewhat schematic illustration of a calcining system employing a tube cooler and a separate calcinator, connector to a tertiary air conduit, and provided with start-up burners.

FIG. 3 illustrates a calcining system similar to that of FIG. 1 however utilizing a tube cooler 42. It includes a rotary kiln 8 with a kiln 7 and a suspension gas preheater 4' composed of four cyclone stages 1', 2', 3' and 43 as well as with a separate calcinator combustion chamber 44. A tertiary air line 45 bridges across the rotary kiln 8 and, entirely independent of the latter on the gas side, is supplied with hot combustion air recovered through the cooler 42. The calcinator 44 is equipped with a fuel supply device 46 and in accordance with the present invention has an independent start-up burner 47 at the entry end of the tertiary air line 45 into the calcinator 44. The tertiary air line 45 itself is likewise equipped with a start-up burner 48 which in the start-up state can be driven at full capacity or at partial capacity in the operating state. At the discharge end 49 of the tube cooler 42 there is provided a separate and independent heater in the form of a burner 50. The rotary kiln 8 as in the previously described forms is provided with a primary burner 18. In the case of the system illustrated in FIG. 3, upon starting up from the cold state, the burners 18, 50, 48, and 47 are ignited at substantially the same time and slowly brought up to temperature. The system in accordance with conventional practice is equipped at several locations with temperature monitors and when the various stages have achieved temperature levels necessary for starting up production, raw meal is charged through an inlet 51. The primary burner 18 is then brought up to capacity and the auxiliary burner is used for start-up means, such as burner 50 and burners 48 and 47 are slowly turned down and finally extinguished. The start-up operation is thus terminated and the system is ready for production.

In comparison with the start-up from the cold state without the heating installation of the present invention, the system of the invention saves considerable start-up time. In fact, it has been shown that the start-up period can be shortened by more than one-half. A considerable production loss is thus avoided and heating energy is saved.

For regulating or control in the start-up state as well as in the transition state from starting to running production, a furnace gas tube 56 is provided between the rotary kiln 8 and the cyclone 43, together with a partial gas exhaust or vent 57 adjustable from 0 to 100% venting. The furnace gas tube 56 opens into a gas exit 58 from the calcinator 44 in the fourth cyclone stage 43 and in addition there is provided a partial exhaust or withdrawal of the preheated raw material through a line 70 into the furnace gas tube 56.

Figure 4:
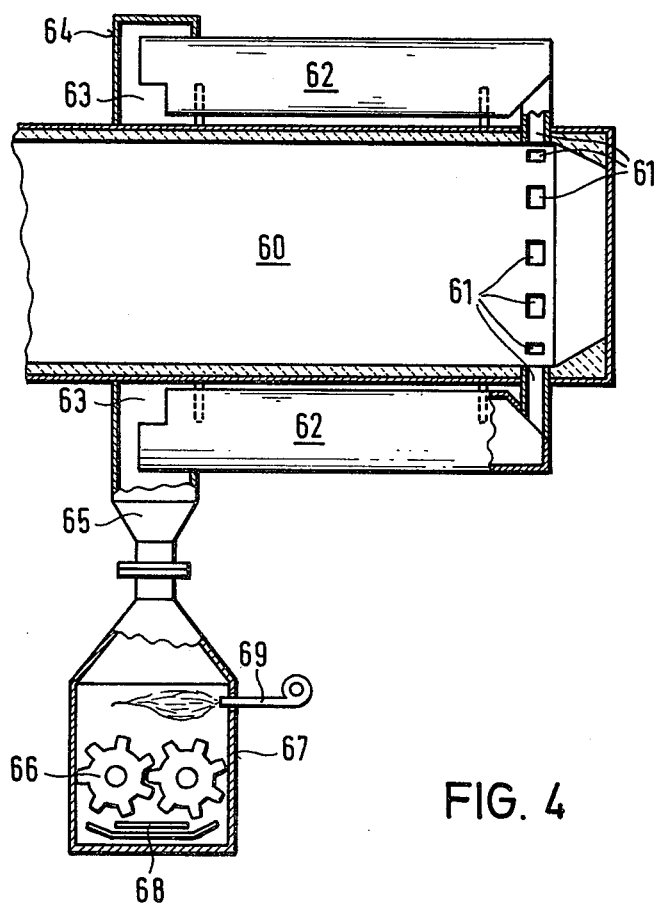
FIG. 4 is a partial view in cross section of a satellite cooler having a start-up heating installation in the region of the clinker discharge housing.

An arrangement according to the present invention which uses a satellite cooler is illustrated in FIG. 4. A rotary kiln 60 is connected by means of satellite tubes 62 provided with exchange openings 61 which discharge into suitable discharge openings. By means of the exchange openings 61, hot clinker is discharged from the rotary kiln 60 and is introduced into the satellite tubes 62. The latter rotate in common with the rotary kiln 60. Air is drawn in counter-current relationship to the hot clinker from openings 63 of the satellite tubes, the air becoming heated in the interior of the tubes 62 during the cooling operation. The air flows as hot secondary air at approximately 1,000° C. through the exchange openings 61 into the rotary kiln 60. The rotating free openings of the satellite tubes 62 move within a stationary discharge housing 64 which at the lower end is provided with a crusher 66 and a crusher housing 67 surrounding the same. A clinker transport 68 is disposed therein. In accordance with the present invention, this satellite cooler is provided with an additional burner 69 in the upper portion of the crusher housing 67. As in the sample embodiments previously described, instead of the burner 69 a hot gas connection similar to that used in FIG. 1, or an electric convection heater similar to FIG. 2, or a heat exchanger or hot gas generator similar to that shown in FIG. 2c could also be used.

In each embodiment illustrated, the system of the present invention makes it possible prior to or during the start-up procedure to supply a calcining system with heat for the purpose of heating up from the cooler. The start-up heating installation is independent from the remaining heat generators of the system. This is important because significant parts of the system such as the cooler, the calcining stage, and up to the preheating stage can be heated in the idle state for the purpose of starting up so that the actual heating up to a high temperature for production purposes is accomplished in a relatively short time.

It will be evident that various modifications can be made to the described embodiments without departing from the scope of the present invention.

We claim as our invention:

1. A calcining system for the manufacture of cement clinker and the like comprising:
   a preheater,
   means for introducing raw material to be calcined into said preheater,
   a rotary kiln,
   means for transporting preheated material from said preheater into said rotary kiln,
   a cooler,
   means connecting the discharge of said rotary kiln to said cooler, and
   heater means operatively associated directly with said cooler to bring said cooler up to operating temperatures during start-up.

2. A system according to claim 1 in which:
   said heater means is independent of the remainder of the calcining system.

3. A system according to claim 1 which includes:
   a source of hot gas independent of the remaining calcining system connected to said heater means for heating the same.

4. A system according to claim 3 in which:
   said source of hot gas is a separate burner.

5. A system according to claim 1 in which:
   said heater means includes an electrical heater.

6. A system according to claim 1 in which:
   said heater means includes a circulating fluid heat exchanger.

7. A system according to claim 1 which includes:
   a conduit arranged to recycle gases from said cooler into said preheater, and
   burner means disposed in said conduit for heating the interior thereof.

8. A system according to claim 1 which includes:
   a calcinator interconnecting said preheater and said rotary kiln, and
   an additional burner means positioned in said calcinator to preheat the same.

9. A system according to claim 1 in which:
   said cooler is a tube type cooler and said heater means is positioned at the discharge end of said cooler.

10. A system according to claim 1 which includes:
    means for introducing coal dust as a fuel into said rotary kiln, and
    means for introducing coal dust as a fuel into said heater means.

* * * * *